United States Patent
Espenhain et al.

(10) Patent No.: US 12,466,272 B2
(45) Date of Patent: Nov. 11, 2025

(54) METHOD FOR CONTROLLING THE DRIVE FORCE OF A MOTOR VEHICLE REAR AXLE, WHICH IS DRIVEN BY AN ELECTRIC MOTOR, IN THE EVENT OF AN IMMINENT DRIVE OVER A MILLED EDGE

(71) Applicant: Bayerische Motoren Werke Aktiengesellschaft, Munich (DE)

(72) Inventors: Marc Espenhain, Munich (DE); Werner Foag, Munich (DE); Nora Gruen, Munich (DE); Claudio Struckmann, Munich (DE); Christian Wimmer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 122 days.

(21) Appl. No.: 18/563,470

(22) PCT Filed: Apr. 8, 2022

(86) PCT No.: PCT/EP2022/059423
§ 371 (c)(1),
(2) Date: Nov. 22, 2023

(87) PCT Pub. No.: WO2022/248112
PCT Pub. Date: Dec. 1, 2022

(65) Prior Publication Data
US 2024/0262214 A1    Aug. 8, 2024

(30) Foreign Application Priority Data
May 28, 2021 (DE) .................. 10 2021 113 873.6

(51) Int. Cl.
*B60L 15/20* (2006.01)
*B60L 3/10* (2006.01)

(52) U.S. Cl.
CPC ............. *B60L 15/20* (2013.01); *B60L 3/106* (2013.01); *B60L 2240/423* (2013.01)

(58) Field of Classification Search
CPC ............. B60L 15/20; B60L 2240/423; B60L 2240/10; B60L 2240/12; B60L 2240/465; B60L 2240/647; B60L 3/10; B60L 3/106; B60L 50/60; B60L 2260/50; B60T 8/245
See application file for complete search history.

(56) References Cited

U.S. PATENT DOCUMENTS

| | | |
|---|---|---|
| 5,915,488 A | 6/1999 | Fliege |
| 2014/0163836 A1 | 6/2014 | Um et al. |
| 2015/0232093 A1 | 8/2015 | Fairgrieve et al. |
| 2020/0198624 A1 | 6/2020 | Akatsuka |

FOREIGN PATENT DOCUMENTS

| | | |
|---|---|---|
| DE | 195 02 501 A1 | 8/1996 |
| DE | 10 2010 055 223 A1 | 7/2011 |
| EP | 2 581 259 A1 | 4/2013 |
| TR | 201722678 A2 * | 7/2019 |

OTHER PUBLICATIONS

International Search Report (PCT/ISA/210) issued in PCT Application No. PCT/EP2022/059423 dated Aug. 19, 2022 with English translation (4 pages).
German-language Written Opinion (PCT/ISA/237) issued in PCT Application No. PCT/EP2022/059423 dated Aug. 19, 2022 with English translation (9 pages).
German-language Search Report issued in German Application No. 10 2021 113 873.6 dated Jan. 28, 2022 with partial English translation (12 pages).

* cited by examiner

*Primary Examiner* — Michael J Zanelli
(74) *Attorney, Agent, or Firm* — Crowell & Moring LLP

(57) ABSTRACT

A method for detecting an eminent drive of at least one rear wheel of an electrically driven rear axle of a motor vehicle over a milled edge during a forward drive is provided. For this purpose, the motor vehicle has a vertical position sensor system on the front axle. Changes in the vertical position of at least one front wheel or the front axle are forwarded to a controller which limits the torque power that can be requested from the electric drive unit of the rear axle in the event of changes in the vertical position which exceed a specific threshold.

5 Claims, No Drawings

METHOD FOR CONTROLLING THE DRIVE FORCE OF A MOTOR VEHICLE REAR AXLE, WHICH IS DRIVEN BY AN ELECTRIC MOTOR, IN THE EVENT OF AN IMMINENT DRIVE OVER A MILLED EDGE

BACKGROUND AND SUMMARY

The invention relates to a method for controlling the drive force of a rear axle, driven by an electric motor, of a motor vehicle in the event of an imminent negotiation of a milled edge.

So-called milled edges in the road of motor vehicles are formed, on the one hand, by elevations or depressions of a road by design, in most instances in order to influence the speed of motor vehicles, in most instances embodied as grooves or ramps in the road surface, this including crossings of sidewalks, and relate in particular to the slow-travel operating mode. Predominantly in the fast-driving mode, in particular on freeways or multi-lane highways constructed from concrete, stress-relief joints which also run transversely are present in the road surface for reasons relating to structural physics. Very generally, other vertical road surface inconsistencies or jumps in terms of the coefficient of friction of the road are also conceivable, or specific types of damage to the road are sufficiently deep to cause a milled-edge effect, in this instance mostly for only one vehicle wheel of a vehicle axle. Hereafter, for the sake of simplicity, all manifestations of this type are referred to as negotiating a milled edge, this in terms of the scope of protection for this method not intended to mean that it inevitably has to be a milled edge that causes such an effect in which a driven rear axle which is in most instances lifted in the vertical direction is at risk, because the wheels of this rear axle—as a result of being continuously driven by the motor vehicle—continue to be accelerated in the air and when subsequently landing on the road surface and expending their excess circumferential speed generate extremely high moments in the drivetrain when the wheels are again stressed by the full contact force.

When such potential negotiations of milled edges are thus included as driving maneuvers for designing the components in battery-driven electric vehicles with electric rear-wheel drive, this can in certain circumstances lead to many components being sized with a view to the high mechanical loads that arise on the motor vehicle when such a milled edge is negotiated. This affects, for example, the mounting blocks of the electric drive unit, or the suspension mounting of a high-voltage battery. The high load acting on such a component has its root cause in that the rear wheels during a maneuver negotiating a milled edge are accelerated by the driver in order to be able to overcome the milled edge, but shortly thereafter are de-stressed in the vertical direction, owing to the milled edge having been overcome, as a result of which tire slippage which impedes the traction of the rear wheels is created in the drive direction. When the rear axle is stressed again, this generates a high contact force and, as a result, extremely high moments in the drivetrain. Since an electric drive unit can build up very high start-up torques at the beginning of acceleration, such a load with such high torques arises only in electrically driven axles.

Adjustment devices for a vehicle driving force, for example for hybrid vehicles, are already known from the prior art. DE 10 2010 055 223 A1, for example, describes various adjustment devices of this kind, which have a driving force adjustment mechanism for a drive, which generates a torque difference between a first wheel and a second wheel of a vehicle and for this purpose possesses a feedback-control device and/or control device which carries out the following:

Detecting an actual rotating-speed difference between the first wheel and the second wheel;
calculating a target rotating-speed difference based on the speed and the steering angle of the vehicle;
calculating a corrective torque which allows the actual rotating-speed difference to follow the target rotating-speed difference;
calculating a maximum differential limiting torque which delimits a maximum value of the corrective torque, based on an activation state;
calculating a delimited torque difference in which an upper limit value of an absolute vale of the corrective torque is delimited by the maximum differential limiting torque; and
carrying out a differential delimitation in order to obtain the delimited torque difference.

In one embodiment, the differential delimitation feedback-control device is used in a vehicle that uses an internal combustion engine (engine, or drive unit) and an electric motor as a drive source, i.e., a so-called hybrid vehicle. For example, in a configuration in which a front-axle shaft is used as the primary drive shaft driven by the engine, and a rear-axle shaft is used as a secondary drive shaft driven by the electric motor.

It is an object of the invention to provide a method for controlling the driving force of a rear axle, driven by an electric motor, of a motor vehicle, which using means already available in the motor vehicle identifies an imminent negotiation of a milled edge by the rear axle and by virtue thereof, prior to the great load being created on the drive components, by actuating the drive of the rear wheels weakens the great load in such a way that the drive components do not have to be especially sized for the great load.

This object is achieved by the method steps of the first claim. Further configurations of the method are described in the dependent claims.

The method according to the invention for identifying an imminent negotiation of a milled edge by at least one rear wheel of an electrically driven rear axle of a motor vehicle in forward travel, to which end the motor vehicle possesses a height level sensor system on the front axle, is characterized in that height level variations of at least one front wheel or of the front axle are transmitted to a control apparatus which in the event of height level variations that exceed a specific threshold value delimits the torque output on standby in the electric drive unit of the rear axle.

This has the advantage that by so-called preliminary sensing, in particular by way of a height level sensor system on the front axle, which is already available in the motor vehicle owing to other applications, the drive control of the latter can already detect a negotiation of a milled edge by the rear axle at an early stage, whereupon the torque output on standby of the electric drive unit is consequently delimited.

In this way, the protection of components takes place by a feedback-control algorithm of the control software. As a result, the components of the drivetrain, such as the drive shaft, the casing of the drive unit, mounting blocks and bearings can be sized for lower loads when negotiating milled edges, and/or more degrees of freedom for the disposal of the bearings can be implemented, for example, a smaller support base, i.e., the bearings can be positioned closer to one another in the longitudinal direction of the vehicle.

A preferred method is distinguished in that the torque output at the rear axle is delimited at least from a point in time at which the contact force of the at least one rear wheel or of the rear axle is at the minimum.

Alternatively thereto, another preferred method can also be used, which is distinguished in that the point in time of delimiting the torque output at the rear axle is calculated by the control apparatus, at least from a momentary speed of the motor vehicle at the point in time of the height level variation of at least one front wheel or of the front axle, and from a wheelbase of the motor vehicle.

Proposed again as an alternative application within the scope of the invention is another advantageous method which is characterized in that the torque output delimitation at the rear axle is activated by the control apparatus immediately after the point in time at which the latter, from the height level sensor system of at least one front wheel or of the front axle, has processed height level variations above the specified threshold value.

Each of these alternative methods can be advantageously refined in that, when a changed measured value of the height level sensor system is created, the amount of the threshold value is established by the control apparatus as a function of the momentary speed of the motor vehicle.

The invention claimed is:

1. A method for identifying an imminent negotiation of a milled edge by at least one rear wheel of an electrically driven rear axle of a motor vehicle in forward travel, at which end the motor vehicle possesses a height level sensor system on the front axle, wherein height level variations of at least one front wheel or of the front axle are transmitted to a control apparatus which in an event of height level variations that exceed a specific threshold value delimits a torque output on standby in an electric drive unit of the rear axle.

2. The method according to claim 1, wherein the torque output at the rear axle is delimited at least from a point in time at which the contact force of the at least one rear wheel or of the rear axle is at a minimum.

3. The method according to claim 1, wherein a point in time of delimiting the torque output at the rear axle is calculated by the control apparatus, at least from a momentary speed of the motor vehicle at a point in time of the height level variation of at least one front wheel or of the front axle, and from a wheelbase of the motor vehicle.

4. The method according to claim 1, wherein a torque output delimitation at the rear axle is activated by the control apparatus immediately after the point in time at which the control apparatus, from the height level sensor system of at least one front wheel or of the front axle, has processed the height variations above the specific threshold value.

5. The method according to claim 4, wherein an amount of the specific threshold value is determined by the control apparatus as a function of speed, and/or is stored in the control apparatus.

* * * * *